H. H. HEIMAR.
NUT LOCK.
APPLICATION FILED DEC. 13, 1913.
1,104,731.
Patented July 21, 1914.
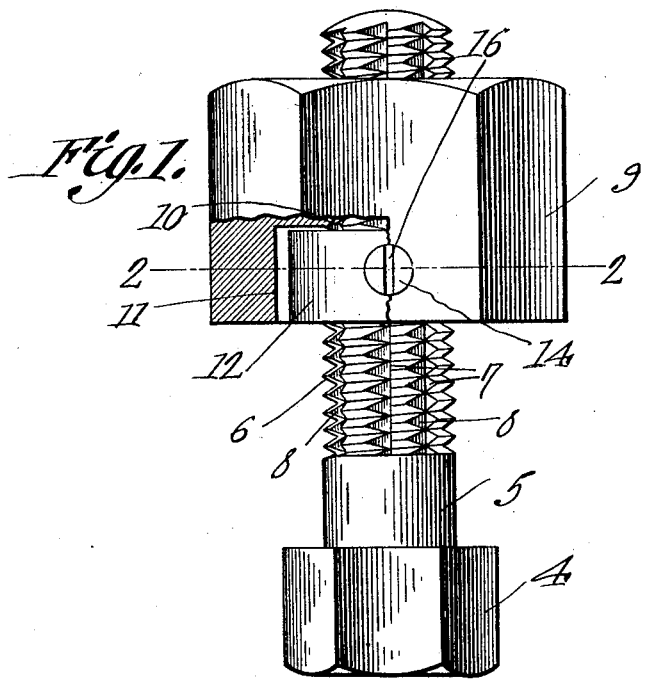
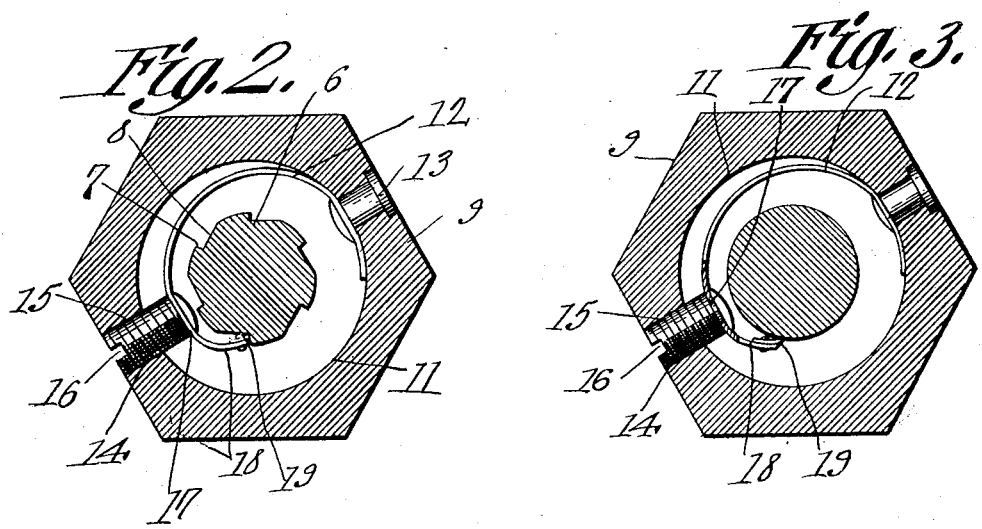
Witnesses
H. H. Heimar
Inventor
by
Attorneys

UNITED STATES PATENT OFFICE.

HAYNIE H. HEIMAR, OF DURHAM, NORTH CAROLINA.

NUT-LOCK.

1,104,731. Specification of Letters Patent. Patented July 21, 1914.

Application filed December 13, 1913. Serial No. 806,498.

*To all whom it may concern:*

Be it known that I, HAYNIE H. HEIMAR, a citizen of the United States, residing at Durham, in the county of Durham and State of North Carolina, have invented a new and useful Nut-Lock, of which the following is a specification.

This invention relates to improvements in nut locks.

An object of the present invention is to provide a nut lock of simple construction and which will, when locked in place have no protruding parts projecting therefrom.

A further object is to provide a lock nut comprising a spiral spring and to which spiral spring is secured a chisel point or blade so that it will engage the threads of a bolt and when in engagement therewith will prevent the rotating of the nut thereabout.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in elevation of a bolt with my improved nut secured thereto. Fig. 2 is a cross sectional view thereof taken on the line 2—2. Fig. 3 is a cross sectional view in which the bolt threads are not mutilated.

Referring to the drawings in which similar reference numerals designate corresponding parts throughout the several views, a bolt 4 includes the threaded shank 5 and which threads are notched or mutilated as at 6. The notches are of a particular configuration and include the outstanding or radial face 7 and the sloping and approximately tangential face 8.

The nut 9 is of any convenient external polygonal shape and is provided with the threaded bore 10 extending the greater distance therethrough. A second and larger bore 11 extends the remaining distance through the nut and is concentric therewith.

A spiral spring 12 is positioned within the bore 11 and is rigidly secured to the side wall thereof by the rivet 13 or other equivalent means.

Positioned adjacent the remote and free end of the spiral spring 12 is the adjusting threaded pin 14 which is in engagement therewith and threadedly engages the threaded aperture 15 of the nut. The top or outer surface of the pin is provided with a groove 16 extending thereacross and by means of which a screw driver may be utilized for the turning of the pin. The lower or inner extremity of the pin which engages the spiral spring 12 is provided with the annular or peripheral groove 17 extending therearound and in which a portion of the spiral spring fits.

The extreme end of the spiral spring is bent inwardly or centrally as at 18 to which is secured the chisel point or blade 19. The chisel point or blade is provided with a sharpened edge which engages the bolt and when in contact therewith holds the bolt and nut against relative rotation. The chisel blade may fit down within one of the notches or mutilated portions of the bolt as illustrated in Fig. 2 and when so positioned will positively lock said nut and bolt against rotation in one direction, the direction being that which would tend to loosen the nut and bolt. The pin 14 is located adjacent the extreme end of the spiral spring member so that it will prevent the spring from being sprung outwardly by a reverse turning of the bolt and nut. However, it is to be understood in this connection that there is some little play between the pin 14 and the spiral spring so that the natural resiliency of the spring will lend itself to the end or chisel blade 19 which contacts with the bolt threads. The chisel blade may be resiliently held into contact with the threads of a bolt which are not mutilated as illustrated in Fig. 3 and will when so positioned securely lock the parts against relative rotation in one direction. The threaded pin when unscrewed draws the end 18 of the spiral locking spring away from and out of contact with the bolt threads and allows for the free relative rotation of the bolt and nut in either direction. The entire construction is of the simplest nature and due to the spiral contour of the locking spring, the threaded pin may extend radial and will move the end 18 directly toward or away from the peripheral portion of the bolt threads. Also mention is made of the fact that when, as illustrated in Fig. 2, the threaded pin is screwed inwardly and the locking spring in contact with the bolt the said pin extends flush with the surface of the nut so that there will be no projecting parts such as could catch in the hands or clothes of the mechanic.

Having thus fully disclosed my invention, what I claim to be new is:

1. A lock nut comprising a polygonal body portion, said body portion provided with a threaded bore extending the majority of the distance therethrough, said nut provided with a second bore communicating with the first mentioned bore and relatively larger than the same, a spiral locking spring positioned within the second mentioned bore, means for rigidly securing the same to the side walls thereof, a threaded pin extending through the side walls of said second mentioned bore and rotatably engaging said spiral spring adjacent the free end thereof, and a chisel blade provided at the extreme end of said spiral spring, said chisel blade adapted to engage the threads of a bolt.

2. A lock nut comprising a body portion provided with a threaded bore extending partially therethrough said nut provided with a second bore relatively larger than the first mentioned bore communicating and co-axial therewith, a spiral locking spring positioned within the said second mentioned bore, means rigidly securing the said spring to the side walls of said bore, a threaded pin extending through the side walls of the second mentioned bore and rotatably and non-translatably engaging the said spiral spring adjacent the free end thereof, and enlarged and sharpened means at the extreme end of said spiral spring adapted to engage the threads of a bolt.

In testimony that I claim the foregoing as my own, I have hereto affixed my signature in the presence of two witnesses.

HAYNIE H. HEIMAR.

Witnesses:
C. M. WILSON,
A. M. ROSE.

---

Copies of this patent may be obtained for five cents each, by addressing the "Commissioner of Patents, Washington, D. C."